I. A. VANCIL & W. F. FULKERSON.
APPARATUS FOR AUTOMATICALLY CONTROLLING STEREOPTICONS.
APPLICATION FILED FEB. 27, 1917.
1,230,347. Patented June 19, 1917.
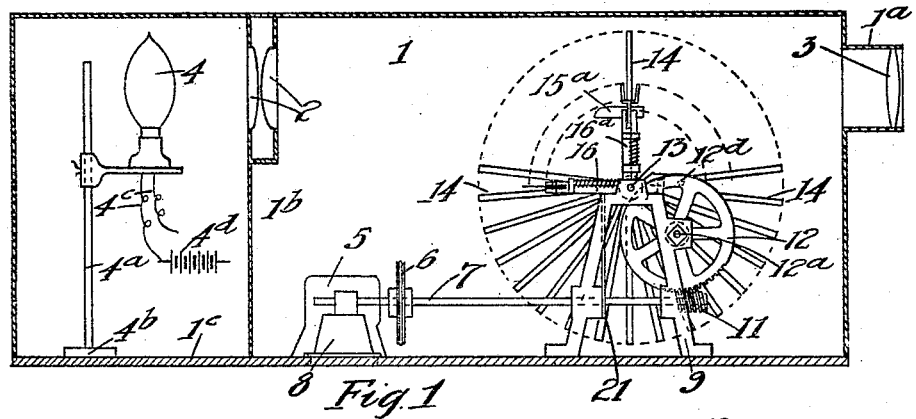
Inventors
Isaac A. Vancil
Walter F. Fulkerson
by A. B. Bowman
Attorney

UNITED STATES PATENT OFFICE.

ISAAC A. VANCIL AND WALTER F. FULKERSON, OF SAN DIEGO, CALIFORNIA.

APPARATUS FOR AUTOMATICALLY CONTROLLING STEREOPTICONS.

1,230,347.  Specification of Letters Patent.  Patented June 19, 1917.

Application filed February 27, 1917. Serial No. 151,193.

*To all whom it may concern:*

Be it known that we, ISAAC A. VANCIL and WALTER F. FULKERSON, citizens of the United States, residing at San Diego, in the county of San Diego and State of California, have invented certain new and useful Improvements in Apparatus for Automatically Controlling Stereopticons, of which the following is a specification.

Our invention relates to an apparatus for automatically controlling the operation of a stereopticon so that all the various operations necessary for exhibiting a series of pictures will be successively carried out without requiring the attention of an operator, and the objects of our invention are; first, to provide automatic controlling means for successively changing the pictures exhibited by a stereopticon; second, to provide an apparatus of this class to so move the slides or plates that the succeeding pictures shown come into view with the vanishing of the preceding picture; third, to provide an apparatus of this class in which two of the slides are actuated simultaneously, the one taken from the projecting position and the other placed in the projection position, and the remaining slides and holders gravitating to their proper position; fourth, to provide an apparatus of this class in which the slide from which the picture is projected is left clear so that there is no danger of confusion with other slides; fifth, to provide an apparatus of this class which is in a very compact form so that the same utilizes a minimum of space; sixth, to provide an apparatus of this class in which the operation is positive and steady so that if plates are used there is no danger of breakage, and; seventh, to provide an apparatus of this class which is simple and economical of construction, durable, positive in its action and will not readily deteriorate or get out of order.

With these and other objects in view as will appear hereinafter, our invention consists of certain novel features of construction, combination and arrangement of parts as will be hereinafter described in detail and particularly set forth in the appended claims, reference being had to the accompanying drawings and to the characters of reference thereon which form a part of this specification, in which:

Figure 1 is a side elevational view of our apparatus, showing one side removed from the casing to facilitate the illustration. Fig. 2 is a plan view of the apparatus for periodically moving the slide holders. Fig. 3 is a detailed side elevational view on an enlarged scale of the particular device for engaging the slide holders and moving the same. Fig. 4 is a similar view of the arm portion thereof with some of the parts removed. Fig. 5 is a side elevational view in detail of one of the parts shown in Fig. 3 and not shown in Fig. 4. Fig. 6 is a similar view of another part shown in Fig. 3 and not shown in Fig. 4. Fig. 7 is a detailed side elevational view of the spring member for holding the slide holder in position for the projection of a picture and Fig. 8 is an end view of one of the slide holders.

Similar characters of reference refer to similar parts throughout the several views.

The casing 1, condensers 2, lens 3, lamp 4, motor 5, sheave 6, shaft 7, bracket 8, bracket 9, bracket 10, worm pinion 11, gear 12, shaft 13, slide supports 14, slide holder retaining spring 15, lever 16, bifurcated finger 17, finger 18, trip 19, trip 20 and stop 21 constitute the principal parts of our apparatus.

The casing 1 may be any shape desired and it serves as an inclosure for the operating apparatus. Mounted in the front end thereof is a lens 3 in a projecting tube $1^a$ so as to permit the lens to be moved in said tube $1^a$ backwardly and forwardly relatively to the slide to be projected for changing the size of the picture thrown on the screen. Mounted in said casing 1 is a partition $1^b$ providing a lamp compartment in the rear end of said casing. Mounted in the upper side of this partition in the middle of said casing are the condensers 2 which are in alinement with the lens 3 and in the compartment back of the partition $1^b$ is a lamp 4 adjustably mounted on a pedestal $4^a$ which is shiftably mounted in a support $4^b$ which is secured to the floor $1^c$ of said casing 1, thus permitting the adjustment of the lamp relatively to the condensers 2 as desired. This lamp is preferably an electric lamp provided with terminals $4^c$ extending to a battery $4^d$ or they may be extended to any source of electrical energy. Mounted in front of the partition $1^b$ is an electrical motor 5 and in alinement with the sheave thereon is a sheave 6 secured to the shaft 7. Said shaft 7 is journaled in bearings on the brackets 8 and 9. Secured to the one end of the shaft 7 is the worm pinion 11 which engages the gear 12 which is revolubly mounted on a shaft 12ª secured in the bracket 9. Secured in the upper portion of the brackets 9 and 10 and extending between them is the shaft 13 upon which are pivotally mounted the slide holders 14 by means of arms 14ª, two on each one which are provided with holes in their extended ends which are mounted over said shaft 13 so that the holders 14 are revolubly mounted on said shaft and adapted to rest against each other so that they gravitate in a cluster together as shown best in Fig. 1 of the drawings. It will be here noted that the arms 14ª on the holders 14 are positioned so as to be offset slightly to the ones on the adjacent holder as shown best in Fig. 2 of the drawings. The holder 14 is preferably a rectangularly shaped frame provided with a slot 14ᵇ in one end thereof adapted to permit the slide or plate to be inserted therein and over the same is provided a spring clip 14ᶜ for holding the slide or plate in position after it is inserted therein all as shown best in Fig. 8. Secured to the shaft 13 adjacent the holder arms and in an upright position is a slide holder retaining member 15 shown best in Fig. 7 of the drawings which is spring tempered and on its upper end is provided a curved portion 15ª adapted to engage the slide holder when it is raised in a vertical position as shown best in Fig. 1 of the drawings and hold said holder in position while the picture is being projected. In order to move the slide holders automatically there is provided a bell crank lever 16, one arm of which is designated 16ª. This lever which is shown best in Figs. 3 and 4 of the drawings is pivotally mounted on the shaft 13 at point 16ᵇ, and the arm designated 16 is provided with a slot 16ᶜ in its extended end in which is pivotally mounted the finger 18. This finger 18 is moved on its pivotal mounting as shown best by solid and dotted lines in Fig. 2 of the drawings by the trip 19, Fig. 5, which is slidably mounted relatively to the lever 16 and supported by means of the keepers 16ᵈ. This finger 18 is provided with a slot 18ª therein in which is mounted the pin 19ª and on said trip is provided a compression spring 19ᵇ adapted to normally hold the finger 18 in the position shown by dotted lines in Fig. 2 of the drawings. This trip member 19 is also provided with a beveled portion 19ᶜ against which rests the beveled end 20ª of the trip 20 as shown best in Figs. 3 and 6 of the drawings. This trip 20 is provided with a compression spring 20ᵇ tending to hold said trip 20 downwardly and in the upper end of said trip is secured a pin 20ᶜ which engages a hole in a projecting portion of the finger 17 so that the spring tends to hold the finger 17 in alinement with the arm 16ª. Secured in one side of the gear 12 is a pin 12ᵈ which is adapted to engage the slot 16ᵉ with the lever 16 in its revolution and also the end 19ᵈ of the trip 19 which in turn shifts the trip 19 endwise relatively to the lever 16 turning the finger 18 to the position shown by dotted lines in Fig. 2 of the drawings and at the same time the beveled portion 19ᶜ of the trip 19 engages the beveled portion 20ª of the trip 20 which in turn moves the finger 17 to the position shown by dotted lines in Fig. 2 of the drawings so that the two members of the finger 17 go on opposite sides of the vertical support, and the finger 18 moves inwardly below the next slide support and with the continuation of the revolution of the gear 12 the lever 16 complete as shown in Fig. 3 is revolved on its pivot point 16ᵇ carrying the vertical support and slide from which the picture has been projected downwardly and the next support up in position for projection. When the gear 12 has revolved sufficiently to disengage the slot 16ᵉ the springs 19ᵇ and 20ᵇ thrust the trips 19 and 20 and their connecting fingers into the position shown in Fig. 3 and the lever 16 is carried back to its original position as shown in Fig. 1 of the drawings by means of a torsion spring 16ᶠ which connects with said lever 16 and with the shaft 13 tending to hold the lever 16 in the position shown best in Figs. 1, 3 and 4. In order to stop the lever when it has reached the proper position for engaging the slide supports there is provided a stop 21 which is adjustably mounted on the bracket 9 and extends upwardly a suitable distance to stop the lever 16 when the spring 16ᶠ has brought it back to the proper position. When the gear 12 has made another revolution this same operation is repeated thus automatically moving the projecting support and slide out of projecting position and the succeeding one into projecting position. The motor 5 is operated by any source of electrical energy.

Though we have shown and described a particular construction, combination and arrangement of parts, we do not wish to be limited to this particular construction, combination and arrangement, but desire to include in the purview of our invention the construction, combination and arrangement substantially as set forth in the appended claims.

It is obvious that with this construction there is provided a means for automatically moving the successive slide holders into position for projection and for holding them in such position a certain length of time as desired, that the succeeding slide comes into projecting position as the other goes out of projecting position thus producing the incoming picture with the vanishing of the outgoing picture, that the device is so constructed that it may be placed in a very compact form, that the apparatus as a whole is very simple and economical of construction, durable, positive in its action and will not readily deteriorate or get out of order.

Having thus described our invention, what we claim as new and desire to secure by Letters Patent is:

1. In an apparatus of the class described, the combination of a plurality of slide holders revolubly mounted relatively to each other, means for simultaneously moving one of said holders to a vertical position and another to an approximate horizontal position, and means for illuminating the slide in the holder which is in vertical position.

2. In an apparatus of the class described, the combination of a plurality of slide holders revolubly mounted on a shaft and revolubly mounted relatively to each other, a bell crank member pivotally mounted on said shaft, each member thereof provided with pivotally mounted finger members, means for operating said finger members, and means for operating said bell crank member, whereby said finger members will engage two of said supports and simultaneously move one to a vertical position and another out of a vertical position.

3. In an apparatus of the class described, the combination of a plurality of slide holders revolubly mounted on a shaft and resting against each other in a cluster, a bell crank lever pivotally mounted on said shaft, a finger pivotally mounted on the extended end of each arm of said lever, means for engaging said lever for turning said lever on said shaft and for simultaneously operating said fingers whereby two of said holders are revolved on said shaft, the one to a vertical projecting position and the other out of the vertical and out of projecting position.

4. In an apparatus of the class described, the combination of a plurality of slide holders revolubly mounted on a shaft and resting against each other in a cluster, a bell crank lever pivotally mounted on said shaft, a finger pivotally mounted on the extended end of each arm of said lever, means for engaging said lever for turning said lever on said shaft and for simultaneously operating said fingers whereby two of said holders are revolved on said shaft, the one to a vertical projecting position and the other out of the vertical and out of projecting position, and means for illuminating the slide in said vertical holder.

5. In an apparatus of the class described, the combination of a plurality of slide holders revolubly mounted relatively to each other on a horizontal axis, a bell crank lever pivotally mounted on the same axis to one side of said slide holders, a finger pivotally mounted in each extended end of said lever adapted to be moved to engagement with said slide holders, means for moving said fingers into and out of engaging position, revoluble means for engaging said means, a slot in said lever for simultaneously revolving said lever and turning said fingers into engaging positions, means for disengaging said fingers and means for revolving said lever in the reverse direction simultaneously, and means for stopping said lever in its reverse revolution in its proper position whereby said slide holders are intermittently held in a vertical position a pre-determined length of time.

6. In an apparatus of the class described, the combination of a plurality of slide holders revolubly mounted relatively to each other on a horizontal axis, a bell crank lever pivotally mounted on the same axis to one side of said slide holders, a finger pivotally mounted in each extended end of said lever adapted to be moved to engagement with said slide holders, means for moving said fingers into and out of engaging position, revoluble means for engaging said means, a slot in said lever for simultaneously revolving said lever and turning said fingers into engaging positions, means for disengaging said fingers, means for revolving said lever in the reverse direction simultaneously, means for stopping said lever in its reverse revolution in its proper position whereby said slide holders are intermittently held in a vertical position a predetermined length of time, and means for illuminating the slide in said vertical positioned slide holder.

7. In an apparatus of the class described, the combination of a plurality of slide holders revolubly mounted on a horizontal axis and relatively mounted to each other, a bell crank member pivotally mounted on said horizontal axis, a finger pivotally mounted on the extended end of each member of said bell crank, trip means for operating said fingers, revoluble means for engaging said trip members and said bell crank member for simultaneously engaging said fingers with adjacent holders and revolving said bell crank, means for revolving said bell crank in the reverse direction, means for disengaging said finger members simultaneously therewith, and means for holding one of said holders in a vertical position.

8. In an apparatus of the class described, the combination of a plurality of slide holders revolubly mounted on a horizontal axis and relatively mounted to each other, a bell crank member pivotally mounted on said horizontal axis, a finger pivotally mounted on the extended end of each member of said bell crank, trip means for operating said fingers, revoluble means for engaging said trip members and said bell crank member for simultaneously engaging said fingers with adjacent holders and revolving said bell crank, means for revolving said bell crank in the reverse direction, means for disengaging said finger members simultaneously therewith, means for holding one of said holders in a vertical position, means for revolving said revoluble means, and means for illuminating a slide in said vertical holder.

In testimony whereof, we have hereunto set our hands at San Diego, California, this 19th day of February 1917.

ISAAC A. VANCIL.
WALTER F. FULKERSON.

Copies of this patent may be obtained for five cents each, by addressing the "Commissioner of Patents, Washington, D. C."